Patented Mar. 22, 1938

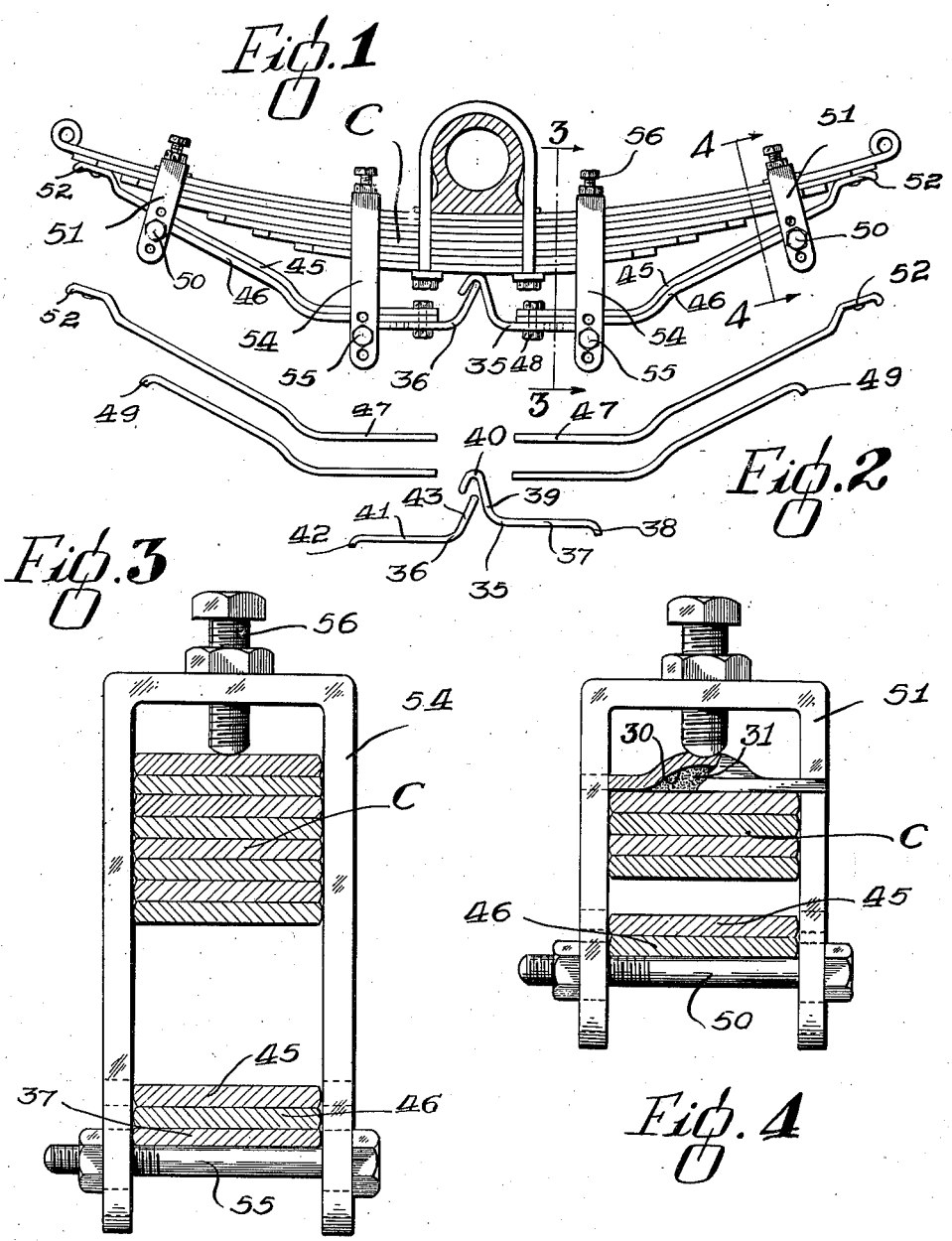

2,112,148

UNITED STATES PATENT OFFICE 2,112,148

VEHICLE SPRING

Alphonse Drolet, Quebec, Quebec, Canada

Application May 21, 1936, Serial No. 81,060

1 Claim. (Cl. 267—45)

The present invention relates to improvements in vehicle spring construction.

An object of the invention is the provision of a spring adapted for use as an auxiliary spring element in conjunction with conventional vehicle suspension springs.

A further object of the invention is the provision of a vehicle spring embodying an auxiliary spring which is adapted to reinforce the main suspension spring of a vehicle when the vehicle is carrying a heavy load.

Another object of the invention is the provision of an auxiliary spring mounted in association with a main vehicle suspension spring in such manner as to present a minimum of friction with a maximum of resiliency.

A further object of the invention is the provision of a vehicle spring which is relatively simple in construction and efficient for the purpose intended.

Other objects and advantages of the invention will become apparent as the description progresses.

In the accompanying drawing forming a part of this specification and in which like reference characters are employed to designate corresponding parts throughout the same:

Figure 1 is a side elevational view showing a rear spring construction in assembly, Figure 2 is a similar view showing the auxiliary spring in separated arrangement, Figure 3 is an enlarged transverse section taken on the line 3—3 of Figure 1, and Figure 4 is an enlarged transverse section taken on the line 4—4 of Figure 1.

Referring to Figures 1 to 3 inclusive, wherein is illustrated an embodiment of an auxiliary spring structure, particularly adaptable for the rear suspension springs of a vehicle, the spring structure is of generally semi-elliptical form and embodies a pair of interlocking centre support sections 35 and 36. The section 35 embodies an elongated portion 37 disposed to assume a horizontal position in assembly, formed with a downwardly curved lip 38 at the outer end. At the inner portion, the section 35 is formed with an upturned arm 39, V-shaped at the top, as indicated at 40. The complementary centre section 36 is also formed with a horizontal elongated portion 41 having a downwardly curved lip 42 at the outer end and having an upturned arm 43 at the inner end. When assembled, the upper extremity of the arm 43 fits into the notch formed by the V member 40, as shown at Figure 1.

To the horizontal portions 37 and 41 of each complementary centre section are connected a pair of identical longitudinally extending leaf sections 45 and 46 each having a straight inner portion 47 adapted to be fitted on and fastened to the horizontal portions of the centre bracket section by means of bolts 48. The outer portions of the sections 45 and 46 are bent to form a reverse curve and to project at an upward angle towards the ends of the rear main suspension spring C of the vehicle. At the outer extremity of each leaf section 46 is formed a downwardly curved lip 49 engaging a bolt 50 on a U-shaped clip 51. The upper leaf-section 45 extends through the clip and is provided at the end with an offset flat contact piece 52 adapted to contact with the underside of the main spring C adjacent the ends and provided with a depressed reservoir 30 adapted to contain a lubricant 31.

Adjacent the centre of the spring assembly are provided a pair of elongated U-shaped clips 54 provided with transverse bolts 55 which may be vertically adjusted in the clips by mounting in different spaced holes therein to properly support the inner portions of the auxiliary spring sections, as illustrated at Figure 1. These clips may be adjusted by means of adjusting screws 56 provided at the top thereof.

When thus assembled, the auxiliary spring is disposed to provide a centre bearing, in the present instance against the underside of the main spring C at the centre, and has the end pieces 52 contacting with the end portions of the main suspension spring which is of the semi-elliptic leaf type.

This auxiliary spring construction is particularly adapted for reinforcing the main suspension spring of the vehicle when the vehicle is operated with a relatively heavy load. Thus, the outer contacting ends of the auxiliary spring may make a light contact with the main spring when the latter is in light load supporting position and functions to reinforce the main spring when the latter is depressed under an increased load of predetermined weight, thus obviating undue stiffness of the suspension when the vehicle is travelling light.

Furthermore, the provision for lubricating the contacting ends of the auxiliary spring provides a minimum of friction between this spring and the main spring and at the same time affords the necessary resiliency.

By the provision of a number of bolt holes at the inner straight end portions of the auxiliary spring sections, the length of the auxiliary spring may be varied to conform to variable length of main springs.

It is to be understood that the forms of my invention herein shown and described are to be taken as preferred examples of the same, and that various changes as to the shape, size and arrangement of parts may be resorted to without departing from the spirit of the invention or the scope of the subjoined claim.

Having thus described my invention, I claim:—

As a re-enforcing attachment for sagging vehicle suspension springs, a pair of cantilever auxiliary springs adapted to be mounted below the main vehicle spring, interlocking levers attached to the inner ends of the auxiliary springs adapted to bear on the lower middle portion of the main spring, a fulcrum comprising a relatively elongated yoke member straddling the main spring near the center thereof and the legs of which extend below the auxiliary springs, a bolt transversely passed through the legs of the yoke under the auxiliary springs, means for adjusting the length of said yoke with respect to the top of the main spring, and shorter similarly adjustable yokes disposed adjacent the ends of the auxiliary springs in order to regulate, in combination with the center yokes, the tension imparted by the auxiliary springs to the main spring ends for re-enforcing purposes.

ALPHONSE DROLET.